Aug. 13, 1968     A. J. HETTICH     3,396,939

HIGH-PRESSURE BLEED VALVE

Filed April 25, 1966

ADAM J. HETTICH
INVENTOR.

BY

ATTORNEY

United States Patent Office 3,396,939
Patented Aug. 13, 1968

3,396,939
HIGH-PRESSURE BLEED VALVE
Adam J. Hettich, Orange, Calif., assignor, by mesne assignments, to James, Pond & Clark, Incorporated, Anaheim, Calif., a corporation of California
Filed Apr. 25, 1966, Ser. No. 544,903
6 Claims. (Cl. 251—253)

This invention relates to precision valve assemblies and more particularly to a simple, highly reliable high-pressure bleed valve adapted to be opened and closed repeatedly under high pressure without risk of erosion from fluid flow.

Equipment designed in recent years to operate at high pressures ranging in thousands of pounds per square inch poses frustrating problems for the valve designer. One of the requirements for certain of these high-pressure systems is a high-precision, highly reliable bleed valve operable to release a small quantity of fluid, either gaseous or liquid, from a supply source having a pressure in the neighborhood of 5,000 and 6,000 p.s.i. It is found that valve ports and valve members as heretofore designed for such applications are unacceptable and unsatisfactory for various reasons. For example, excessive operating forces are required to effect opening of the valves under these high pressures with the result that the parts are deformed, or fail in use, or exceed the available operating power available in such operating environments as missiles, satellites and the like. Particularly objectionable is the inability of prior bleeder designs to withstand successive operating cycles in a leak-proof manner. This is because the seat and valve member are incapable of resisting erosion caused by the very high velocity flow unavoidably occurring in the open position of the valve under extreme pressure differential conditions.

Accordingly, there is provided by the present invention a thoroughly reliable high-performance bleeder valve formed of a minimum number of small dimension, lightweight components so designed as to avoid the above-mentioned and other shortcomings of prior bleed valve constructions. The present valve features a main body having a long tapering flow port and valve seat terminating at its smaller end in a small diameter cylindrical section accommodating a small diameter, complementally shaped operating plunger axially thereof. This valve member comprises a long gently tapering main body having a sealing portion of erosion-resistant elastomer material capped at its smaller end with a metallic tip. The larger end of the valve member faces upstream and is held centered relative to the flow port by a spring-biasing member. Either power or manually operated means may be provided for opening the valve, the means herein shown comprising a manually controlled rotary cam actuator for a plunger and includes torsion spring means normally biasing the plunger to its retracted position allowing the valve to be closed by its seating spring and by the upstream system pressure.

A further feature of the design is the use of a dynamic O-ring between the valve body and the plunger. This O-ring has freedom for limited rolling movement during operation of the valve plunger and is aided in its sealing action while the valve is open by fluid pressure within the valve body.

Accordingly, it is a primary object of the present invention to provide a high-precision, high-pressure bleeder valve designed for opening with a minimum of applied force and having flow control members so designed as to resist cold flow and erosion of the surfaces under high-velocity, high-pressure conditions.

Another object of the invention is the provision of a high-performance, high-pressure bleeder valve having a composite valve member including a metallic tip and a nonmetallic elastomeric seal selected from a material resistant to cold flow under load and to erosion under high-velocity, high-pressure fluid flow as well as a low coefficient of friction.

Another object of the invention is the provision of a highly reliable high-pressure bleed valve featuring a long, tapering flow port and a cooperating closure comprising unattached components including an inner metallic tip and an outer larger-diameter nonmetallic seal cooperating when open to provide a long annular flow port of decreasing flow area.

These and other more specific objects will appear upon reading the following specification and claims and upon considering in connection therewith the attached drawings to which they relate.

Referring now to the drawings in which a preferred embodiment of the invention is illustrated.

Figure 3:
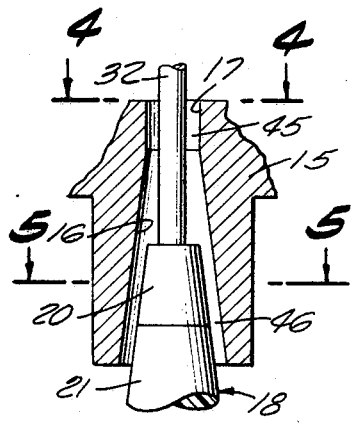
Figure 4:
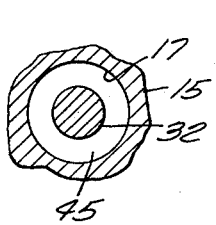
Figure 5:
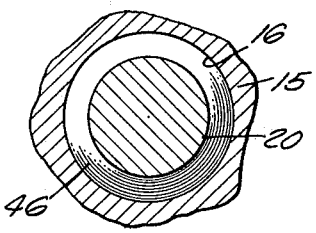

FIGURE 3 is an enlarged fragmentary sectional view through the valve port and showing the valve in open position; and FIGURES 4 and 5 are cross-sectional views on an enlarged scale taken along lines 4—4 and 5—5, respectively, on FIGURE 3.

Figure 1:
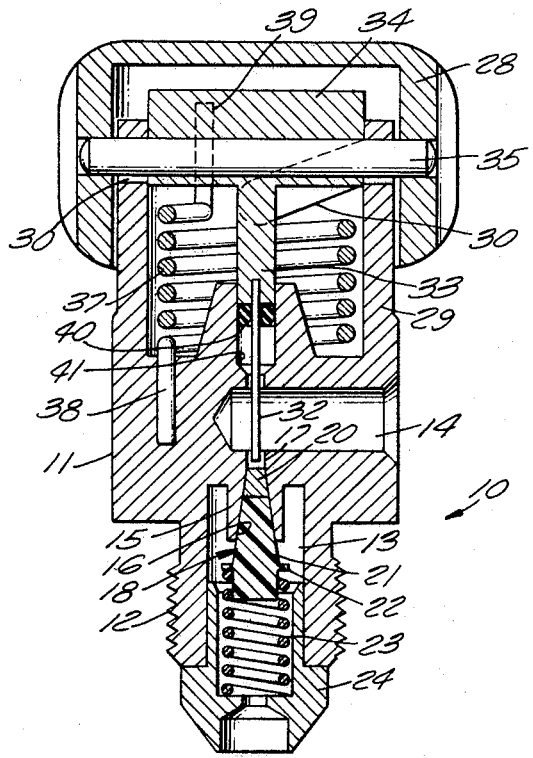
FIGURE 1 is a cross-sectional view on an enlarged scale of a preferred embodiment of the bleeder valve with the parts in closed position.
Figure 2:
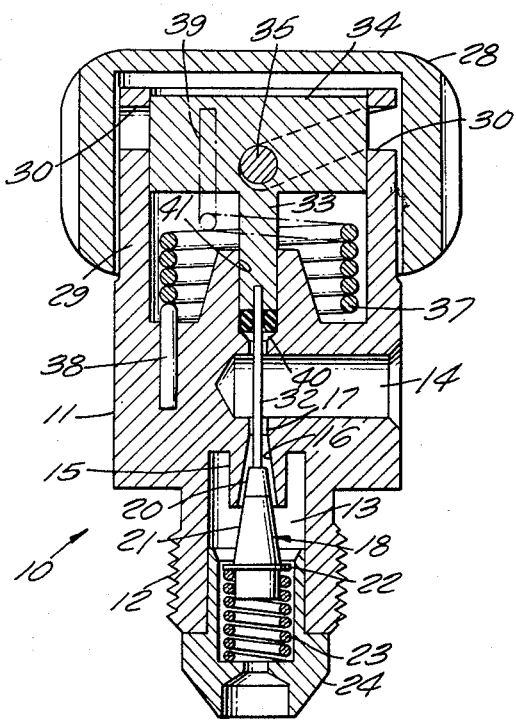
FIGURE 2 is a view similar to FIGURE 1 but showing the valve in open position.

Referring more particularly to FIGURES 1 and 2, there is shown at double scale or larger a typical construction of the invention bleeder valve, designated generally 10, and having a one-piece main body 11 of generally cylindrical configuration and provided at one end with a threaded coupling shank 12. This body is formed interiorly thereof with a generally L-shaped flow passage including an inlet leg 13 opening through shank 12 and an outlet leg 14 opening laterally through the body side wall. The junction of legs 13 and 14 includes a tubular barrier 15 formed integral with the main body and along which the high-precision flow port is formed. This flow port includes a long, slightly tapering, frusto-conical inlet end 16 merging at its smaller downstream end with a relatively short cylindrical outlet section 17 opening laterally into outlet leg 14.

Flow-through ports 16 and 17 are controlled by a unitary composite valve member designated generally 18. This valve member has a metallic tip 20 opposite but preferably unattached to the forward end of the main valve body 21 which is formed of elastomeric sealing material having special properties. For example, this material must be selected for its ability to withstand cold flow under load, one naturally having or capable of being finished with a highly polished exterior surface having a minimal coefficient of friction as respects fluid flow therepast during use of the valve and, in particular, be highly resistant to erosion. These factors taken with the location of the resilient sealing member 21 at the larger end of the composite tapering closure plug mutually contribute to the relatively small temperature rise taking place as the gas flows through the bleeder port 16 when the closure is open. This low temperature rise prevents objectional erosion of member 21 and is the major reason for the long trouble-free service life of the closure assembly. Nylon and the elastomeric sold under the trade name Teflon are found satisfactory and are preferably employed for member 21.

As here shown, the larger rear end of valve body 21 is provided with a flange 22 seating the inner end of a light coil spring 23 effective to hold the valve centered in the flow port while open and to seat the valve in cooperation with the system pressure when the valve is not forcibly held open. The outer end of spring 23 seats within a well formed axially of a fitting 24 having a press fit within the outer end of shank 12.

The included taper angle between the side walls of port 16 is of importance, an angle of 16 degrees being found to provide highly satisfactory results. However, it will be understood that slight variations to either side of this value may be used.

Operating means for opening the valve member, as herein shown, include a rotary cup-shaped handle 28 telescoped loosely over the outer end of an annular skirt 29 integral with the valve body. The diametrically opposed side walls of skirt 29 are provided with arcuate cam slots 30, 30 each extending along approximately one-quarter of the circumference of the skirt. The valve-operating plunger includes a small diameter inner pin portion 32 loosely socketed within the inner end of a shank 33 having an enlarged head 34 fitting loosely within skirt 29. This plunger is held detachably assembled to the handle by a snug-fitting pin 35 extending through aligned openings in handle 28 and an opening through plunger end 34. This pin also extends loosely through cam slots 30. Operating handle 28 and the plunger elements 32, 33, 34 are urged to rotate counterclockwise by a stiff torsion spring 37 concealed within skirt 29 and having one end 38 anchored to the main body and the other end 39 anchored to plunger 34.

A positive fluid seal between the valve operating plunger 32 and the valve body comprising a small O-ring 40 embracing plunger 32 and housed snugly within a deep well 41 formed in the valve body. This O-ring is free to roll along plunger 32 during closing movement of the operating handle.

Referring now to FIGURES 3 to 5, other important details of the present design will be pointed out. Thus, when the valve is open, operating plunger 32 is positioned centrally in the relatively small diameter cylindrical section 17 of the port. Accordingly, the flow area for the escaping high pressure fluid is represented by the annular ring 45 in FIGURE 4. This flow areas is very substantially smaller than the upstream flow area between the exterior of valve elements 20, 21 and the tapering valve seat surface 16. The radius of this annular flow passage is preferably slightly less than that of ring 45 and, in addition, the circumference dimensions of the two rings are widely different. In consequence, it will be apparent that the flow velocity along passage 46 is very substantially smaller than the velocity along annular passage 45. The high velocity flow in passage 45 between the metal parts can be tolerated since the flow-contacting surfaces are of metal. It also can be tolerated past the metal tip 20 of the valve; however, the velocity of the flow occurring past the smaller diameter end of the elastomeric body is reduced sufficiently by the expedient just described as to avoid eroding the side wall of the smooth-surfaced elastomeric used for the main body 21 of the valve and found essential in providing a truly reliable seal with the tapering side wall 16 of the valve port. Furthermore, and as is made evident by FIGURES 2 and 3, only a relatively short length of the elastomeric is exposed to the high velocity fluid flow. However, a very substantial length of the soft elastomeric material is in seating engagement with the flaring seat 16 of the valve port when the valve is closed.

A further feature of the design is the fact that the operating plunger is separate and distinct from the valve body itself. Accordingly, the plunger does not interfere with the centering or the firm seating of the valve proper which, when open, remains floatingly supported on the inner end of spring 23. Furthermore, the high velocity flow occurring when the valve is open serves to maintain the valve centered in the port in readiness for instant seating upon retraction of the plunger assembly. The valve must be forcibly held open by rotating and holding the plunger in extended position against the action of torsion spring 37. Instantly upon release of the holding force on handle 28, spring 37 retracts the plunger and allows the valve to seat under the action of spring 23 and the system pressure upstream from the valve.

While the particular high pressure bleed valve herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A high-pressure bleed valve having a main body provided with a generally L-shaped flow passage therethrough having an inlet leg and an outlet leg and including flow port means adjacent the junction of said legs, said port means including a long slightly tapered flow passage diverging toward the inlet end of said inlet leg and with its smaller end having a relatively short cylindrical section opening into said outlet leg, a long valve member reciprocably supported in said port means comprising a metallic tip and a substantially larger main body of elastomeric material highly resistant to erosion by high-velocity fluid flow therepast and each having its sides tapering at the same angle as the juxtaposed walls of said port means and cooperating therewith when seated firmly thereagainst to provide a long frusto-conical sealing surface, spring means in the inlet leg of said flow passage engaging the upstream end of said valve member and urging the same toward seating engagement with said port means, means for opening said valve member including cam-actuated plunger means supported axially of said port means on the downstream side thereof and having a small diameter end centrally of the cylindrical outlet end of said port means and movable into abutment with the metallic tip of said valve member to open the same against the high-pressure fluid normally acting against the upstream end thereof, and the small diameter end of said plunger cooperating with the juxtaposed wall of the cylindrical section of said port means to provide an annular flow passage of substantially smaller area than the area of the annular flow passage between the side wall of the elastomeric portion of said valve member, when open, and the juxtaposed wall of said port means, thereby to limit the flow velocity past said elastomeric material to reduce the erosive effects of fluid flow thereon.

2. A bleed valve as defined in claim 1 characterized in that said plunger means for opening said valve member includes rotary operating means therefor extending through the wall of said main body, and torsion spring means connected between said rotary operating means and said valve body urging said rotary means in a direction permitting said valve member to seat firmly in closed position.

3. A bleed valve as defined in claim 1 characterized in that the elastomeric material of said valve member has a polished surface and a minimal coefficient of friction and is highly resistant to erosion by fluid flow therepast, and the upstream end of said valve member being seated on the adjacent end of said spring means whereby the latter is effective to hold said tapering valve member centered in said port means while in open position.

4. A bleed valve as defined in claim 1 characterized in that said cam-actuated plunger means for opening said valve member includes an annular skirt formed on the exterior of said main body co-axially of said port means, said skirt having arcuate cam slots diametrically opposed to one another, rotary operating handle and cap means embracing the outer end of said skirt, pin means extending through said plunger, said slots and said operating handle and cooperating with said arcuate camming slots as said handle is rotated to reciprocate said plunger means against said valve member to open the latter, and torsion spring means housed within said annular skirt with one end anchored to said main body and the other end to said plunger means and effective to retract said plunger means from said valve member when not forcibly held in open position.

5. A bled valve as defined in claim 1 characterized in the provision of a dynamic rolling O-ring seal means between said main body and said plunger means and effective to prevent leakage past said plunger means in the open position of said valve member.

6. A high-pressure bleed valve having a main body provided with a flow passage therethrough and including means in said flow passage providing a long gently-tapering flow port terminating at its smaller end in a generally cylindrical port, a closure plug for said flow port having a long main body of complemental taper to said flow port and comprising a plurality of disconnected components arranged in end-to-end axially-abutting contact and including a metallic tip at the smaller end of said plug and an elastomeric seal portion adjacent the larger end of said flow port and seatable against the side wall thereof in the closed position of said closure plug whereby, when said plug is open, a higher temperature rise occurs at the metallic tip end of said closure plug rather than opposite said elastomeric seal portion, and plunger means reciprocable axially against said metallic tip and effective to open said closure plug against high-pressure fluid normally acting on the larger upstream end of said closure plug.

References Cited
UNITED STATES PATENTS

| | | | |
|---|---|---|---|
| 2,485,092 | 10/1949 | Gannon | 251—332 |
| 3,330,527 | 7/1967 | Nurkiewicz | 251—332 X |

WILLIAM F. O'DEA, *Primary Examiner.*

D. R. MATTHEWS, *Assistant Examiner.*